US012651701B2

(12) United States Patent
Park et al.

(10) Patent No.: US 12,651,701 B2
(45) Date of Patent: Jun. 9, 2026

(54) MULTILAYERED CERAMIC CAPACITOR

(71) Applicant: SAMSUNG ELECTRO-MECHANICS CO., LTD., Suwon-si (KR)

(72) Inventors: Chae Min Park, Suwon-si (KR); Yong-Won Seo, Suwon-si (KR); Youngjun Cha, Suwon-si (KR); Seonho Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 88 days.

(21) Appl. No.: 18/583,248

(22) Filed: Feb. 21, 2024

(65) Prior Publication Data

US 2024/0331940 A1     Oct. 3, 2024

(30) Foreign Application Priority Data

Apr. 3, 2023     (KR) ........................ 10-2023-0043344

(51) Int. Cl.
H01G 4/008 (2006.01)
H01G 4/12 (2006.01)
H01G 4/30 (2006.01)

(52) U.S. Cl.
CPC ........... H01G 4/008 (2013.01); H01G 4/1209 (2013.01); H01G 4/30 (2013.01)

(58) Field of Classification Search
CPC ......... H01G 4/008; H01G 4/1209; H01G 4/30
See application file for complete search history.

(56) References Cited

U.S. PATENT DOCUMENTS

2009/0291317 A1     11/2009     Kawasaki et al.
2009/0310277 A1     12/2009     Kayatani et al.
(Continued)

FOREIGN PATENT DOCUMENTS

JP     2009-283598 A     12/2009
JP     2010-278373 A     12/2010
(Continued)

OTHER PUBLICATIONS

The Extended European Search Report dated Feb. 4, 2025 issued in European Patent Application No. 24168028.9.

*Primary Examiner* — Michael P Mcfadden
(74) *Attorney, Agent, or Firm* — Morgan, Lewis & Bockius LLP

(57)     ABSTRACT

A multilayer ceramic capacitor may include: a ceramic body that includes dielectric layers and internal electrodes; an external electrode including a connection portion that covers an end surface of the ceramic body and a band portion that extends from the connection portion to cover a side surface of the ceramic body; a first cover layer disposed between the internal electrode closest to the side surface and the side surface; a second cover layer opposing the first cover layer; an active region in which the internal electrodes overlap and spaced apart from the end surface by a first distance, a first dummy electrode disposed in the first cover layer, and a seed electrode layer disposed between the band portion and the first cover layer, wherein a length of the seed electrode layer is greater than the first distance and greater than a length of the first dummy electrode.

20 Claims, 12 Drawing Sheets

(56)    References Cited

U.S. PATENT DOCUMENTS

| | | | |
|---|---|---|---|
| 2009/0323253 A1 | 12/2009 | Kobayashi et al. | |
| 2010/0302704 A1 | 12/2010 | Ogawa et al. | |
| 2014/0293503 A1 | 10/2014 | Sasabayashi et al. | |
| 2015/0083475 A1* | 3/2015 | Kim | H01G 2/06 |
| | | | 29/25.42 |
| 2015/0223340 A1* | 8/2015 | Jung | H01G 4/008 |
| | | | 156/89.12 |
| 2016/0240317 A1* | 8/2016 | Ro | H01G 4/30 |
| 2017/0287640 A1* | 10/2017 | Choi | H01G 4/30 |
| 2018/0075970 A1* | 3/2018 | Sato | H01G 4/12 |
| 2018/0182552 A1 | 6/2018 | Sawada et al. | |
| 2019/0066923 A1* | 2/2019 | Jung | H01G 4/008 |
| 2020/0027658 A1* | 1/2020 | Lee | H01G 4/012 |
| 2020/0043656 A1* | 2/2020 | Kim | H01G 4/012 |
| 2020/0152382 A1 | 5/2020 | Sakurai et al. | |
| 2020/0388439 A1* | 12/2020 | Togawa | H01G 4/2325 |
| 2021/0327649 A1* | 10/2021 | Muramatsu | H01G 4/30 |

FOREIGN PATENT DOCUMENTS

| | | | |
|---|---|---|---|
| JP | 5282634 | B2 | 9/2013 |
| JP | 6323017 | B2 | 1/2014 |
| JP | 2020-167367 | A | 10/2020 |
| KR | 10-2057040 | B1 | 12/2019 |

* cited by examiner 123
153
128
153

MULTILAYERED CERAMIC CAPACITOR

CROSS-REFERENCE TO RELATED APPLICATION

This application claims priority to and the benefit of Korean Patent Application No. 10-2023-0043344, filed in the Korean Intellectual Property Office on Apr. 3, 2023, the entire contents of which are incorporated herein by reference.

BACKGROUND

(a) Field

The present disclosure relates to a multilayer ceramic capacitor.

(b) Description of the Related Art

Electronic components using ceramic materials include capacitors, inductors, piezoelectric elements, varistors, or thermistors. Among such ceramic electronic components, a multilayer ceramic capacitor (MLCC) may be used in various electronic devices due to its small size, high capacity, and easy mounting.

For example, the multilayer ceramic capacitor may be used for chip-type capacitors that are mounted in boards of various electronic products to charge or discharge electricity, including imaging devices such as liquid crystal displays (LCDs), plasma display panels (PDPs), and organic light-emitting diode (OLED) displays, computers, personal portable terminals, and smartphones.

According to a recent trend of miniaturization and thinning of electronic products, a demand for a multilayer ceramic capacitor having a thinner thickness than that of an existing multilayer ceramic capacitor is increasing. In particular, for a multilayer ceramic capacitor having a width that is 1.5 times or more than twice a thickness thereof, it is important to form an external electrode to increase mounting reliability.

SUMMARY

An embodiment has been made in an effort to provide a multilayer ceramic capacitor capable of easily controlling an area covered by an external electrode while forming a uniform external electrode.

However, the problem to be solved by the exemplary embodiments of the present disclosure is not limited to the above-described problems, and can be variously extended within the scope of the technical spirit included in the present disclosure.

An aspect of the present disclosure provides a multilayer ceramic capacitor, including: a ceramic body that includes a plurality of dielectric layers and a plurality of internal electrodes; an external electrode including a connection portion that covers an end surface of the ceramic body in a first direction and a band portion that extends from the connection portion to cover a side surface of the ceramic body in a second direction, the second direction intersecting the first direction; a first cover layer disposed between the internal electrode closest to the side surface and the side surface; a second cover layer that is opposed to the first cover layer along the second direction; an active region in which the plurality of internal electrodes overlaps along the second direction; and spaced apart from the end surface by a first distance, a first dummy electrode disposed in the first cover layer, and a seed electrode layer disposed between the band portion and the first cover layer, in which a length of the seed electrode layer in the first direction is greater than the first distance and greater than a length of the first dummy electrode in the first direction.

Furthermore, a thickness $T1$ of the seed electrode layer may be 0.05 um or more and 1.0 um or less.

Furthermore, the length of the seed electrode layer may be $\frac{1}{4}$ or more and less than $\frac{1}{2}$ of a length of the ceramic body in the first direction.

Furthermore, an edge of the connection portion toward the second cover layer may be spaced apart from an outer surface of the second cover layer by a second distance in the first direction, and the second distance may be smaller than a thickness of the second cover layer.

Furthermore, the first dummy electrode may be in contact with or protrude from the end surface.

Furthermore, the length of the first dummy electrode may be a distance between opposite end portions of the first dummy electrode along the first direction, and the length of the first dummy electrode may be smaller than the first distance.

Furthermore, the first dummy electrode may include a plurality of layers.

Furthermore, the layers of the first dummy electrode may be spaced apart from each other along the second direction.

Furthermore, each layer of the first dummy electrode may be disposed at uniform intervals along the second direction.

Furthermore, the multilayer ceramic capacitor may further include a second dummy electrode disposed in the second cover layer.

Furthermore, an edge of the connection portion toward the second cover layer may be spaced apart from an outer surface of the second cover layer by a second distance in the second direction, the second dummy electrode may be in contact with or protrude from the end surface, the second dummy electrode may be spaced apart from an outer surface of the second cover layer by a third distance in the second direction, and the third distance may be greater than the second distance and smaller than a thickness of the second cover layer.

Furthermore, a length of the second dummy electrode may be a distance between opposite end portions of the second dummy electrode along the first direction, and the length of the second dummy electrode may be smaller than the first distance.

Furthermore, the second dummy electrode may include a plurality of layers.

Furthermore, each layer of the second dummy electrode may be spaced apart from each other along the second direction.

Furthermore, each layer of the second dummy electrode may be disposed at uniform intervals along the second direction.

Furthermore, the external electrode may include nickel (Ni), copper (Cu), tin (Sn), palladium (Pd), gold (Au), or an alloy thereof.

Furthermore, the external electrode may include a plurality of plating layers.

Furthermore, the external electrode may include: a first plating layer that covers the seed electrode layer and a portion of the end surface of the ceramic body; and a second plating layer that covers the first plating layer.

Furthermore, the external electrode may further include a third plating layer that covers the second plating layer.

No other electrode layer that overlaps the plurality of internal electrodes in the active region may exist in the first cover layer.

In accordance with the multilayer ceramic capacitor according to the embodiment, thickness precision of the external electrodes may be improved by configuring the external electrodes with a plating thin film formed by a direct plating method.

DETAILED DESCRIPTION

Figure 1:
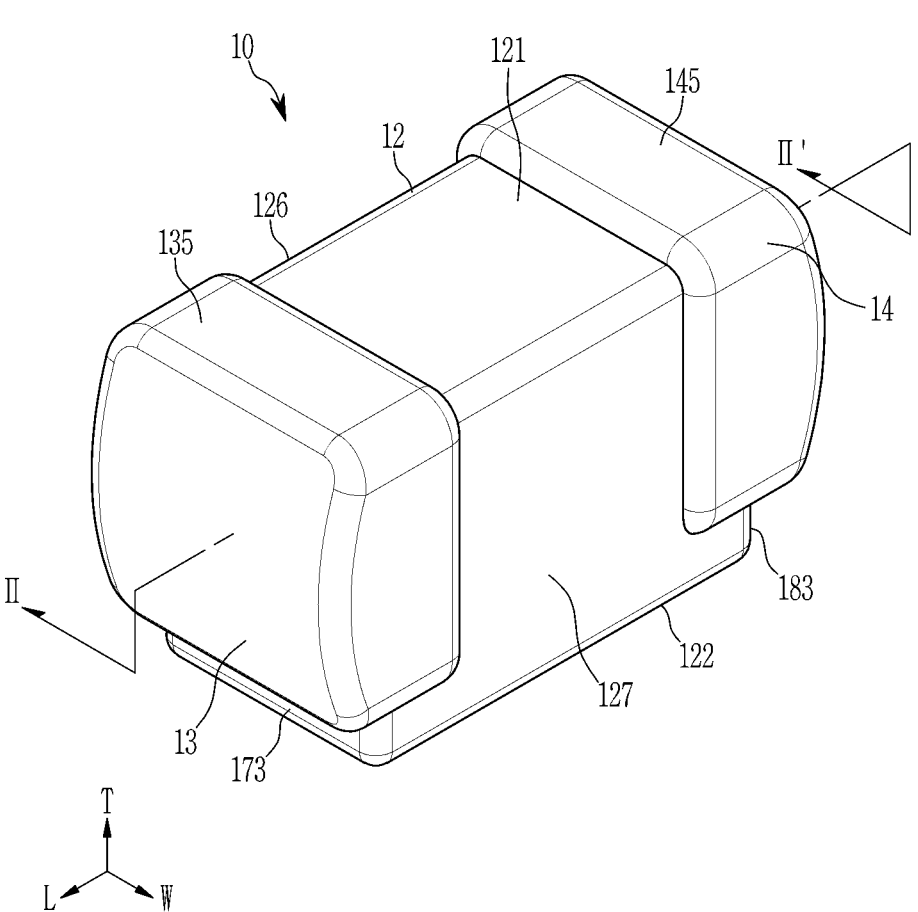
FIG. 1 illustrates a schematic perspective view showing a multilayer ceramic capacitor according to an embodiment.

Hereinafter, various embodiment of the present disclosure will be described in detail so that a person of ordinary skill in the technical field to which the present disclosure belongs can easily implement it with reference to the accompanying drawings. The drawings and description are to be regarded as illustrative in nature and not restrictive. Like reference numerals designate like elements throughout the specification. In addition, some constituent elements in the accompanying drawings are exaggerated, omitted, or schematically illustrated, and the size of each constituent element does not fully reflect the actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be further understood that terms "comprises/includes" or "have" used throughout the specification specify the presence of stated features, numerals, steps, operations, components, parts, or a combination thereof, but do not preclude the presence or addition of one or more other features, numerals, steps, operations, components, parts, or a combination thereof. Accordingly, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means when an object portion is viewed from above, and the phrase "in a cross-sectional view" means when a cross-section taken by vertically cutting an object portion is viewed from the side.

In addition, throughout the specification, "connected" means that two or more components are not only directly connected, but two or more components may be connected indirectly through other components, physically connected as well as being electrically connected, or it may be referred to by different names depending on the location or function, but may mean integral.

Figure 2:
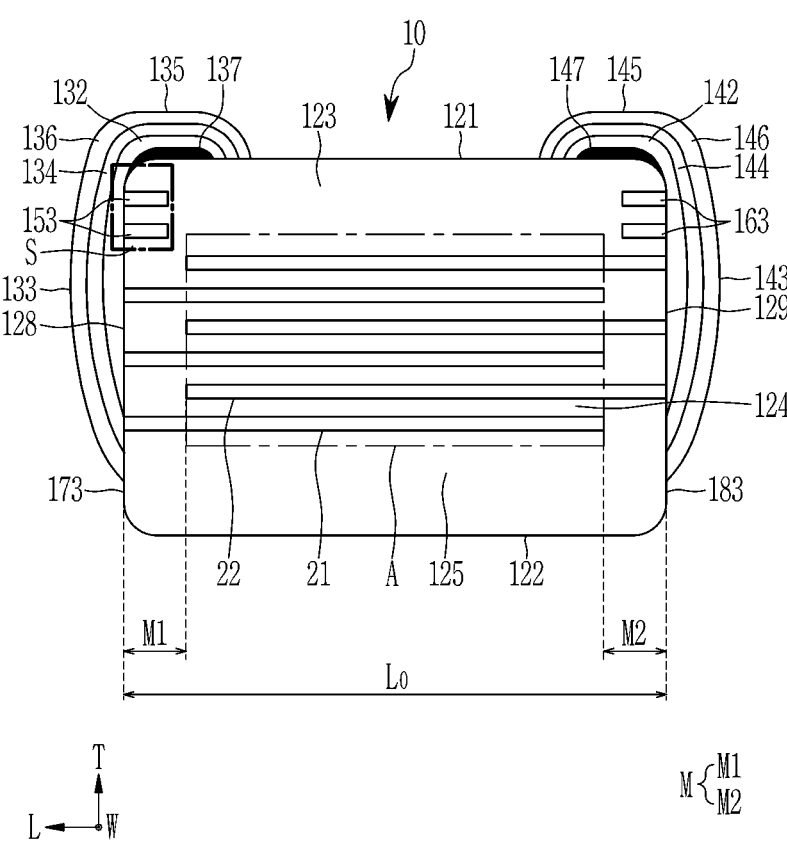
FIG. 2 illustrates a cross-sectional view taken along line II-II' of FIG. 1.
Figure 3:
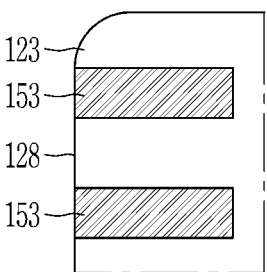
FIG. 3 illustrates an enlarged schematic cross-sectional view of a dotted-line area S of FIG. 2.
Figure 4:
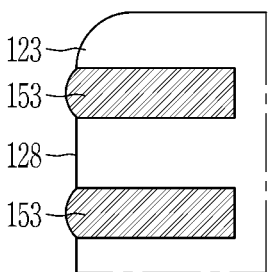
FIG. 4 illustrates a schematic cross-sectional view showing another shape of a dotted line area S of FIG. 2.
Figure 5:
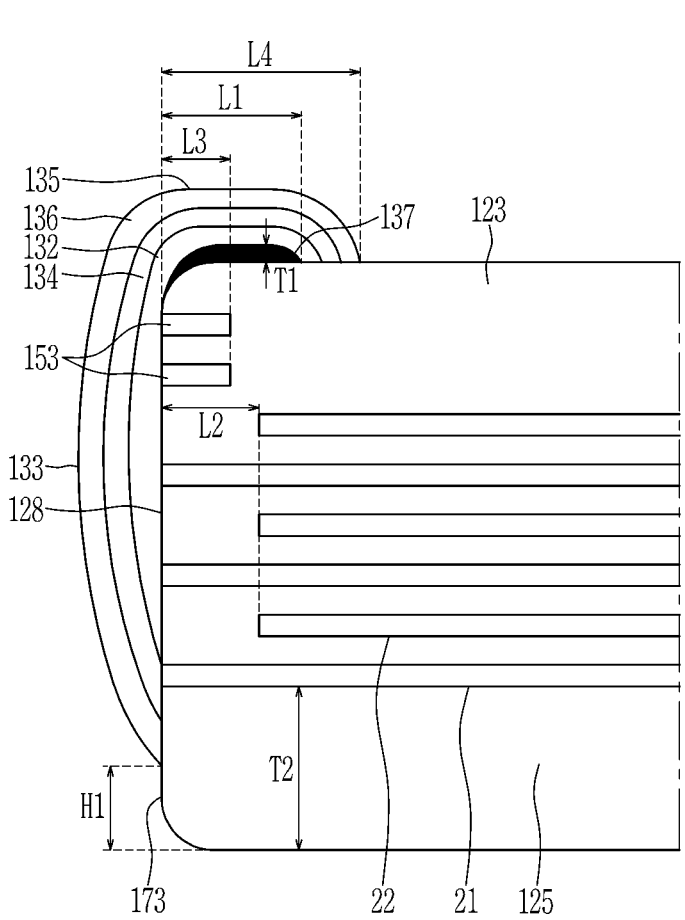
FIG. 5 illustrates a partially enlarged view of FIG. 2.
Figure 6:
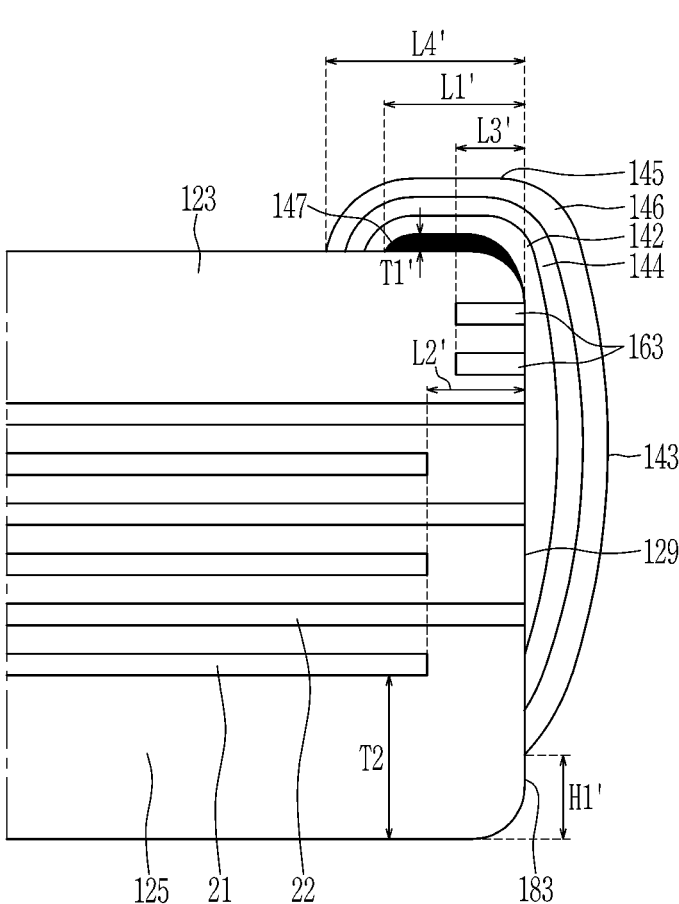
FIG. 6 illustrates another partially enlarged view of FIG. 2.

FIG. 1 illustrates a schematic perspective view showing a multilayer ceramic capacitor according to an embodiment, FIG. 2 illustrates a cross-sectional view taken along line II-II' of FIG. 1, FIG. 3 illustrates an enlarged schematic cross-sectional view of a dotted-line area S of FIG. 2, FIG. 4 illustrates a schematic cross-sectional view showing another shape of a dotted line area S of FIG. 2, FIG. 5 illustrates a partially enlarged view of FIG. 2, and FIG. 6 illustrates another partially enlarged view of FIG. 2.

Referring to FIGS. 1 to 6, the multilayer ceramic capacitor 10 according to the present embodiment includes a ceramic body 12, a first externa electrode 13, a second external electrode 14, a plurality of first internal electrodes 21, a plurality of second internal electrodes 22, a first dummy electrode 153 and a second dummy electrode 163.

First, directions are defined to clearly describe the present embodiment. L, W and T indicated in the figures indicate axes representing a length direction, a width direction, and a thickness direction of the ceramic body 12, respectively.

The thickness direction (T-axis direction) may be a direction that is perpendicular to wide surfaces (main surfaces) of sheet-like components. For example, the thickness direction (T-axis direction) may be a direction in which the dielectric layer 124 is stacked.

The length direction (L-axis direction), which is the direction parallel to the wide surfaces (main surfaces) of the sheet-like components, may be a direction that intersects (or is orthogonal to) the thickness direction (T-axis direction). For example, the length direction (L-axis direction) may be a direction in which the first external electrode 13 and the second external electrode 14 face each other.

The width direction (W-axis direction), which is a direction parallel to the wide surface (main surface) of the sheet-like components, may simultaneously intersect (or orthogonal to) the thickness direction (T-axis direction) and length direction (L-axis direction).

The ceramic body 12 may have a substantially hexahedral shape, but the present embodiment is not limited thereto. Due to shrinkage during sintering, the ceramic body 12 may have a substantially hexahedral shape, but not a perfect hexahedral shape. For example, the ceramic body 12 has a substantially rectangular parallelepiped shape, but portions corresponding to corners or vertices may each have a round shape.

In the present embodiment, for better understanding and ease of description, surfaces facing each other in the thickness direction (T-axis direction) are defined as an upper surface 121 and a lower surface 122, surfaces facing each other in the length direction (L-axis direction) connecting the upper surface 121 and the lower surface 122 are defined as first and second end surfaces 128 and 129, and surfaces facing each other in the width direction (W-axis direction) intersecting the first and second end surfaces 128 and 129 are defined as first and second side surfaces 126 and 127.

A length of the ceramic body 12 is measured on the basis of an optical microscope or scanning electron microscope (SEM) image of a cross-section (taken in the length direction (L-axis direction)-thickness direction (T-axis direction)) of a central portion of the ceramic body 12 in the width direction (W-axis direction). The length of the ceramic body 12 may mean a maximum value among lengths of a plurality of line segments that connect two outermost boundary lines, which are opposite to each other in the length direction (L-axis direction) of the ceramic body 12 shown in the image of the cross-section and are parallel to the length direction (L-axis direction). Alternatively, the length of the ceramic body 12 may mean a minimum value among lengths of a plurality of line segments that connect two outermost boundary lines, which are opposite to each other in the length direction (L-axis direction) of the ceramic body 12 shown in the image of the cross-section and are parallel to the length direction (L-axis direction). Alternatively, the length of the ceramic body 12 may mean an arithmetic mean value of the lengths of at least two line segments among the plurality of line segments that connect two outermost boundary lines, which are opposite to each other in the length direction (L-axis direction) of the ceramic body 12 shown in the image of the cross-section and are parallel to the length direction (L-axis direction). Other methods and/or tools appreciated by one of ordinary skill in the art, even if not described in the present disclosure, may also be used.

A thickness of the ceramic body 12 is measured on the basis of an optical microscope or scanning electron microscope (SEM) image of a cross-section (taken in the length direction (L-axis direction)-thickness direction (T-axis direction)) of a central portion of the ceramic body 12 in the width direction (W-axis direction). The thickness of the ceramic body 12 may mean a maximum value among lengths of a plurality of line segments that connect two outermost boundary lines, which are opposite to each other in the thickness direction (T-axis direction) of the ceramic body 12 shown in the image of the cross-section and are parallel to the thickness direction (T-axis direction). Alternatively, the thickness of the ceramic body 12 may mean a minimum value among lengths of a plurality of line segments that connect two outermost boundary lines, which are opposite to each other in the thickness direction (T-axis direction) of the ceramic body 12 shown in the image of the cross-section and are parallel to the thickness direction (T-axis direction). Alternatively, the thickness of the ceramic body 12 may mean an arithmetic mean value of the lengths of at least two line segments among the plurality of line segments that connect two outermost boundary lines, which are opposite to each other in the thickness direction (T-axis direction) of the ceramic body 12 shown in the image of the cross-section and are parallel to the thickness direction (T-axis direction). Other methods and/or tools appreciated by one of ordinary skill in the art, even if not described in the present disclosure, may also be used.

A width of the ceramic body 12 is measured on the basis of an optical microscope or scanning electron microscope (SEM) image of a cross-section (taken in the length direction (L-axis direction)-width direction (W-axis direction) of a central portion of the ceramic body 12 in the thickness direction (T-axis direction). The width of the ceramic body 12 may mean a maximum value among lengths of a plurality of line segments that connect two outermost boundary lines, which are opposite to each other in the width direction (W-axis direction) of the ceramic body 12 shown in the image of the cross-section and are parallel to the width direction (W-axis direction). Alternatively, the width of the ceramic body 12 may mean a minimum value among lengths of a plurality of line segments that connect two outermost boundary lines, which are opposite to each other in the width direction (W-axis direction) of the ceramic body 12 shown in the image of the cross-section and are parallel to the width direction (W-axis direction). Alternatively, the width of the ceramic body 12 may mean an arithmetic mean value of the lengths of at least two line segments among a plurality of line segments that connect two outermost boundary lines, which are opposite to each other in the width direction (W-axis direction) of the ceramic body 12 shown in the image of the cross-section and are parallel to the width direction (W-axis direction). Other methods and/or tools appreciated by one of ordinary skill in the art, even if not described in the present disclosure, may also be used.

The ceramic body 12 may be formed by stacking a plurality of dielectric layers 124 in the thickness direction (T-axis direction) and then firing it. Here, each of the plurality of adjacent dielectric layers 124 of the ceramic body 12 may be integrated with each other in a state where boundaries are indistinct. For example, the boundaries between each of the adjacent dielectric layers 124 of the ceramic body 12 may be so integrated that they are difficult to confirm without using a scanning electron microscope (SEM).

Meanwhile, a first cover layer 123 may be disposed on a side of the plurality of first or second internal electrodes 21 and 22 along the thickness direction (T-axis direction) within the ceramic body 12. A second cover layer 125 may be disposed on a side of the plurality of first or second internal electrodes 21 and 22 along the thickness direction (T-axis direction) within the ceramic body 12.

That is, a first cover layer 123 having a predetermined thickness may be disposed on an upper portion of the topmost internal electrode in the ceramic body 12, and a second cover layer 125 may be disposed on a lower portion of the bottommost internal electrode in the ceramic body 12. The first cover layer 123 and the second cover layer 125 may have the same composition as the dielectric layer 124, and be formed by stacking one or more dielectric layers respectively on the upper portion of the topmost internal electrode in the ceramic body 12 and on the lower portion of the bottommost internal electrode in the ceramic body 12.

The first and second cover layers 123 and 125 may serve to prevent damage to the first and second internal electrodes 21 and 22 by physical or chemical stress.

The first and second dummy electrodes 153 and 163 are disposed in the first cover layer 123. While there may be more than one first dummy electrode 153 and second dummy electrode 163, one first dummy electrode 153 and one second dummy electrode 163 will be described below, and the description is equally applicable to a plurality of first and second dummy electrodes.

The first dummy electrode 153 may contact the first end surface 128 of the ceramic body 12, or may protrude from the first end surface 128. The second dummy electrode 163 may contact the second end surface 129 of the ceramic body 12, or may protrude from the second end surface 129. The first and second dummy electrodes 153 and 163 will be described in more detail below.

The dielectric layer 124 may include a ceramic material of a high dielectric constant. For example, the ceramic material may include a dielectric ceramic including a component such as $BaTiO_3$, $CaTiO_3$, $SrTiO_3$, or $CaZrO_3$. In addition, an auxiliary component such as a Mn compound, an Fe compound, a Cr compound, a Co compound, or a Ni compound may be further included in these components. Examples of the dielectric layer may include $Ba_{1-x}Ca_x$) $TiO_3$, $Ba(Ti_{1-y}Ca_y)$ $O_3$, $(Ba_{1-x}Ca_x)(Ti_{1-y}Zr_y)O_3$, $Ba(Ti_{1-y}Zr_y)$ $O_3$, or the like in which calcium (Ca), zirconium (Zr), etc. are partially dissolved in $BaTiO_3$, but the present disclosure is not limited thereto.

In addition, the dielectric layer 124 may further include at least one of a ceramic additive, an organic solvent, a plasticizer, a binder, or a dispersant. For example, the ceramic additive may be a transition metal oxide or carbide, a rare-earth element, magnesium (Mg), or aluminum (Al), or the like.

For example, an average thickness of a dielectric layer 111 may be 0.1 μm to 10 μm, but the present disclosure is not limited thereto.

The first external electrode 13 and the second external electrode 14 may be formed by directly plating a conductive metal on the ceramic body 12. That is, the first and second external electrodes 13 and 14 may be plated electrodes. The conductive metal may include nickel (Ni), copper (Cu), palladium (Pd), gold (Au), or an alloy thereof, but the present disclosure is not limited thereto. In other words, the first and second external electrodes 13 and 14 may comprise a plated thin film formed by a direct plating method. A thickness of each of the first and second external electrodes 13 and 14 may be 5 um or more and 10 um or less, and may be 3 μm or more, but the present disclosure is not limited thereto.

In the meantime, when the first and second external electrodes are formed by a method other than direct plating, e.g., by dipping a ceramic body into a conductive paste, the rheology characteristics of the conductive paste may cause thickness differences depending on where the external electrodes are formed, resulting in poor flatness.

The first and second external electrodes 13 and 14 are disposed at opposite end portions of the ceramic body 12 in the length direction (L-axis direction). The first external electrode 13 includes a first connection portion 133 and a first band portion 135. The second external electrode 14 includes a second connection portion 143 and a second band portion 145.

The first connection portion 133 covers a portion of the first end surface 128 of the ceramic body 12, and is electrically connected to the exposed ends of the first internal electrodes 21.

The second connection portion 143 covers a portion of the second end surface 129 of the ceramic body 12, and is electrically connected to the exposed ends of the second internal electrodes 22.

The first band portion 135 extends from the first connection portion 133 to cover a portion of the upper surface 121 and portions of the first and second side surfaces 126 and

127 of the ceramic body 12. The second band portion 145 extends from the second connection portion 143 to cover a portion of the upper surface 121 and portions of the first and second side surfaces 126 and 127 of the ceramic body 12.

A thickness of the first band portion 135 and a thickness of the second band portion 145 are measured on the basis of an optical microscope or scanning electron microscope (SEM) image of a cross-section (taken in the length direction (L-axis direction)-thickness direction (T-axis direction)) at a central portion of the ceramic body 12 in the width (W-axis direction). The thickness of the first band portion 135, that is a distance between outer surface of the first band portion 135 and an outer surface of a first seed electrode layer 137 shown in the image of the cross-section may increase toward edges of the first band portion 135. The thickness of the second band portion 145, that is a distance between outer surface of the second band portion 145 and an outer surface of a second seed electrode layer 147 shown in the image of the cross-section may increase toward edges of the second band portion 145. This is because when the first and second band portions 135 and 145 are formed by plating, a current is concentrated at end portions of the first and second seed electrode layers 137 and 147, and thus a relatively thick plating layer is formed at the end portions of the first and second seed electrode layers 137 and 147 toward the upper surface 121 of the ceramic body 10.

The first band portion 135 may extend along the length direction (L-axis direction) from the first connection portion 133, and may cover a portion of the upper surface 121 toward the first end surface 128 of the ceramic body 12 and portions of the first and second side surfaces 126 and 127 toward the first end surface 128 of the ceramic body 12.

The second band portion 145 may extend along the length direction (L-axis direction) from the second connection portion 143, and may cover a portion of the upper surface 121 toward the second end surface 129 of the ceramic body 12 and portions of the first and second side surfaces 126 and 127 toward the second end surface 129 of the ceramic body 12.

The first seed electrode layer 137 may be disposed between the first band portion 135 and the upper surface 121 of the ceramic body 12. The second seed layer 147 may be disposed between the second band portion 145 and the upper surface 121 of the ceramic body 12. That is, the first seed electrode layer 137 may be printed between the first band portion 135 and the upper surface 121 of the ceramic body 12, and the second seed electrode layer 147 may be printed between the second band portion 145 and the upper surface 121 of the ceramic body 12.

The first and second seed electrode layers 137 and 147 may be formed by printing a paste containing a conductive metal (e.g., nickel (Ni)). Accordingly, the seed electrode layers 137 and 147 are regions containing a sintering inhibitor in addition to the conductive metal. The first and second band portions 135 and 145 may be formed by plating the seed electrode layers 137 and 147 with a conductive metal. Unlike in the seed electrode layers 137 and 147, the first and second band portions 135 and 145 are regions that contain very little components other than the conductive metal.

As described above, the first band portion 135 is formed by plating a conductive metal on the first seed electrode layer 137, and thus a thickness and length of the first external electrode 13 may be selectively controlled using the first seed electrode layer 137. The second band portion 135 is formed by plating a conductive metal on the second seed electrode layer 137, and thus a thickness and length of the second external electrode 14 may be selectively controlled using the second seed electrode layer 147.

Referring to FIG. 2 and FIG. 5, a length L1 of the first seed electrode layer 137 may be equal to or greater than ¼ and less than ½ of the length L0 of the ceramic body 12, but the present disclosure is not limited thereto. Here, the length L0 of the ceramic body 12 is measured on the basis of an optical microscope or scanning electron microscope (SEM) image of a cross-section (taken in the length direction (L-axis direction)-thickness direction (T-axis direction)) at a central portion of the ceramic body 12 in the width direction (W-axis direction). L0 may mean a length of a line segment connecting a central point of the first end surface 128 in the thickness direction (T-axis direction) and a central point of the second end surface 129 in the thickness direction (T-axis direction) of the ceramic body 12 shown in the image of the cross-section. In addition, L1 may mean a distance to an edge of the first seed electrode layer 137 from a straight line passing through the central point in the thickness direction (T-axis direction) of the first end surface 128 of the ceramic body 12 and perpendicular to the length direction (L-axis direction).

A length L4 of the first band portion 135 of the first external electrode 13 may be adjusted by adjusting the length L1 of the first seed electrode layer 137.

The thickness T1 of the first seed electrode layer 137 may be 0.05 μm or more and 1.0 μm or less, but the present disclosure is not limited thereto. Here, T1 is measured on the basis of an optical microscope or scanning electron microscope (SEM) image of a cross-section (taken in the length direction (L-axis direction)-thickness direction (T-axis direction)) at a central portion of the ceramic body 12 in the width direction (W-axis direction). T1 may mean a maximum distance from the upper surface 121 of the ceramic body 12 shown in the image of the cross-section to the outer circumferential surface of the first seed electrode layer 137.

The thickness T1 of the first seed electrode layer 137 may be a value that varies depending on a design of the length L4 of the first band portion 135 of the first external electrode 13. The thickness T1 of the first seed electrode layer 137 may be, for example, ½ of the length L1 of the first seed electrode layer 137, but the present disclosure is not limited thereto.

If the thickness T1 of the first seed electrode layer 137 is smaller than 0.05 um, in a process of heat treatment (sintering), aggregation of metals is severe, thereby deteriorating the uniformity of the first seed electrode layer, and it is difficult to secure uniformity of an electrodeposited layer of the first external electrode 13 grown by a direct plating method thereafter. Conversely, if the first seed electrode layer 137 are too thick (e.g., several um or more), spreadability is deteriorated in a paste step of forming the first seed electrode layer, and thus a difference in thickness occurs between the central point and the edges of the seed electrode layer. That is, in this case, a large thickness difference occurs depending on the location of the first seed electrode layer, and thus it may be difficult to secure flatness of the multilayer ceramic capacitor.

Similarly, referring to FIG. 2 and FIG. 6, a length L1' of the second seed electrode layer 147 may be equal to or greater than ¼ and less than ½ of the length L0 of the ceramic body 12, but the present disclosure is not limited thereto. A length L4' of the second band portion 145 of the second external electrode 14 may be adjusted by adjusting the length L1' of the second seed electrode layer 147. The thickness T1' of the second seed electrode layer 147 may be 0.05 um or more and 1.0 um or less, but the present disclosure is not limited thereto. The thickness T1' of the second seed electrode layer 147 may be a value that varies depending on a design of the length L4' of the second band portion 145 of the second external electrode 14. The thickness T1' of the second seed electrode layer 147 may be, for example, ½ of the length L1' of the second seed electrode layer 147, but the present disclosure is not limited thereto.

Except for the locations, the second seed electrode layer 147, the second band portion 145, and the second external electrode 14 correspond to the first seed electrode layer 137, first band portion 145, and the first external electrode 13, respectively, so repeated descriptions thereof will be omitted.

The first connection portion 133 covers a portion of the first end surface 128 of the ceramic body 12. The first connection portion 133 extends downward from the upper end of the first end surface 128 along the thickness direction (T-axis direction), but does not extend to the lower end of the first end surface 128. That is, there is a gap between a lower end of the first connection portion 133 and a lower end of the first end surface 128. Accordingly, a lower portion of the first end surface 128 is exposed by the first connection portion 133. That is, the first end surface 128 includes a first exposed surface 173 that is not covered by the first connection portion 133.

The second connection portion 143 covers a portion of the second end surface 129 of the ceramic body. The second connection portion 143 extends downward from the upper end of the second end surface 129 along the thickness direction (T-axis direction), but does not extend to the lower end of the second end surface 129. That is, there is a gap between a lower end of the second connection portion 143 and a lower end of the second end surface 129. Accordingly, a lower portion of the second end surface 129 is exposed by the second connection portion 143. That is, the second end surface 129 includes a second exposed surface 183 not covered by the second connection portion 143.

The first and second external electrodes 13 and 14 may each include nickel (Ni), copper (Cu), palladium (Pd), gold (Au), or an alloy thereof. Meanwhile, the first and second external electrodes 13 and 14 may each include a plurality of plating layers. That is, the first external electrode 13 may include a first plating layer 132, a second plating layer 134, and a third plating layer 136. The second external electrode 14 may also include a first plating layer 142, a second plating layer 144, and a third plating layer 146. For example, the first and second external electrodes 13 and 14 may each include combinations of nickel (Ni) layer, copper (Cu) layer, nickel/copper (Ni/Cu) layer, palladium/nickel (Pd/Ni) layer, palladium/nickel/copper (Pd/Ni/Cu) layer and copper/nickel/copper (Cu/Ni/Cu) layer.

In some embodiments, an outermost plating layer may be made of tin (Sn). Since such a tin plating layer has a relatively low melting point, it is possible to improve ease of mounting the first and second external electrodes 13 and 14 on a substrate.

In general, a tin (Sn) plating layer may be bonded to an electrode pad on a substrate through a solder that includes a tin (Sn)-copper (Cu)-silver (Ag) alloy paste. That is, the tin (Sn) plating layer may melt and bond with the solder during a heat treatment (reflow) process.

The first plating layer 132 covers the first seed electrode layer 137 and partially covers the first end surface 128 of the ceramic body 12. For example, the first plating layer 132 may be formed by directly plating a conductive metal with the first seed electrode layer 137, an end portion of the first dummy electrode 153, and end portions of the first internal electrodes 21 as seeds. The second plating layer 142 covers the second seed electrode layer 147 and partially covers the second end surface 129 of the ceramic body 12. For example, the first plating layer 142 may be formed by directly plating a conductive metal with the second seed electrode layer 147, an end portion of the second dummy electrode 163, and end portions of the second internal electrodes 22 as seeds.

The second plating layer 134 may be formed by plating a conductive metal to cover the first plating layer 132, and the third plating layer 136 may be formed by plating a conductive metal to cover the second plating layer 134. The second plating layer 144 may be formed by plating a conductive metal to cover the first plating layer 142, and the third plating layer 146 may be formed by plating a conductive metal to cover the second plating layer 144.

As described above, the end portions of the first dummy electrodes 153 may also function as seeds for plating growth. That is, the first external electrode 13 may be formed by a direct plating method in which a conductive metal is grown by using the first seed electrode layer 137, the end portions of the first dummy electrodes 153, and the end portions of the first internal electrodes 21 as seeds. Since a conductive metal grows with the first dummy electrodes 153 as seeds to form the first plating layer 132 of the first external electrode 13, even when the first external electrode 13 does not contain glass, the first external electrode 13 may maintain contact with the ceramic body 12. Except for the location, the second external electrode 14 corresponds to the first external electrode 13, so a repeated description thereof will be omitted.

The plurality of first and second internal electrodes 21 and 22 are alternately stacked with the dielectric layers 124 interposed therebetween. The first and second internal electrodes 21 and 22 may be formed and stacked on a ceramic sheet comprising the dielectric layer 124, and then may be alternately disposed in the ceramic body 12 along the thickness direction with a single dielectric layer 124 interposed therebetween and sintered. The first and second internal electrodes 21 and 22 are electrodes having different polarities, may be disposed to be opposite to each other in a direction in which the dielectric layers 124 are stacked, and may be electrically insulated from each other by the dielectric layer 124 disposed therebetween.

The first and second internal electrodes 21 and 22 are disposed in a staggered manner in the length direction (L-axis direction) with the dielectric layer 124 interposed therebetween. One end of the first internal electrode 21 is exposed through the first end surface 128, and one end of the second internal electrode 22 is exposed through the second end surface 129. The end of the first internal electrode 21, which is exposed through the first end surface 128 in the length direction (L-axis direction) of the ceramic body 12 as described above, may be disposed electrically connected to the first connection portion 133 of the first external electrode 13 at the first end surface 128. The end of the second internal electrode 22, which is exposed through the second end surface 129 in the length direction (L-axis direction) of the ceramic body 12, may be electrically connected to the second connection portion 143 of the second external electrode 14 at the second end surface 129. In addition, the first and second internal electrodes 21 and 22 may each be made of conductive metal and include nickel (Ni) or a nickel (Ni) alloy, or the like, for example. However, the present disclosure is not limited thereto.

With the above-mentioned configuration, electric charges are accumulated between the first and second internal electrodes 21 and 22, which are opposite to each other, when a predetermined voltage is applied to the first and second external electrodes 13 and 14. Here, the capacitance of the multilayer ceramic capacitor 10 is proportional to an overlap area in which the first and second internal electrodes 21 and 22 overlap each other in the direction along which the dielectric layers 124 are stacked.

In other words, the multilayer ceramic capacitor 10 according to the present embodiment includes an active region A and a margin region M (see FIG. 2). The active region A is a region where the plurality of first and second internal electrodes 21 and 22 overlaps one another along the thickness direction (T-axis direction) in the ceramic body 12, and the margin region M is a region between the active region A and the first and second end surfaces 128 and 129 of the ceramic body 12. That is, the margin region M includes a first margin region M1 between the active region A and the first end surface 128 and a second margin region M2 between the active region A and the second end surface 129.

The first cover layer 123 and the second cover layer 125 are respectively disposed on either side of the plurality of first and second internal electrodes 21 and 22 along the thickness direction (T-axis direction) of the ceramic body 12, respectively, within the ceramic body 12. That is, the first and second cover layers 123 and 125 are disposed outside the active region A along the thickness direction (T-axis direction).

One end surface of the first cover layer 123 is covered by the first external electrode 13 and the other end surface of the first cover layer 123 is covered by the second external electrode 14.

The second cover layer 125 includes the first exposed surface 173 and the second exposed surface 183. The first exposed surface 173 is a portion of the first end surface 128 of the ceramic body 12 which is not covered by the first external electrode 13, and the second exposed surface 183 is a portion of the second end surface 129 of the ceramic body 12 which is not covered by the second external electrode 14. In other words, the first exposed surface 173 is a portion of the first end surface 128 and is a surface exposed by the first external electrode 13, and the second exposed surface 183 is a portion of the second end surface 129 and is a surface exposed by the second external electrode 14.

As described above, both end surfaces of the first cover layer 123 are entirely covered by the first and second external electrodes 13 and 14, while both end surfaces of the second cover layer 125 are partially covered by the first and second external electrodes 13 and 14 and have the first and second exposed surfaces 173 and 183.

A height H1 of the first exposed surface 173 may be smaller than a thickness T2 of the second cover layer 125. Here, H1 is measured on the basis of an optical microscope or scanning electron microscope (SEM) image of a cross-section (taken in the length direction (L-axis direction)-thickness direction (T-axis direction)) at a central point of the ceramic body 12 in the width direction (W-axis direction). H1 may mean a distance from a straight line passing through the central point of the lower surface 122 in the length direction (L-axis direction) and perpendicular to the thickness direction (T-axis direction) of the ceramic body 12 shown in the cross-sectional image to the edge of the first connection portion 133. T2 may mean an arithmetic mean value of values measured at 10 equally spaced points (excluding the portions where the end surfaces 128 and 129 meet the lower surface 122) from a straight line passing through the central point of the lower surface 122 in the length direction (L-axis direction) of the ceramic body 12 and perpendicular to the thickness direction (T-axis direction) to the nearest internal electrode.

If the height H1 of the first exposed surface 173 is greater than the thickness T2 of the second cover layer 125, the lowermost internal electrode, i.e., an internal electrode closest to an outer circumferential surface of the second cover layer 125 in the thickness direction (T-axis direction) is drawn out from the first exposed surface 173, but may not be connected to the first connection portion 133 of the first external electrode 13.

A height H1' of the second exposed surface 183 may be smaller than a thickness T2 of the second cover layer 125. Except for the location, the second exposed surface 183 corresponds to the first exposed surface 173, and thus a repeated description thereof will be omitted.

Meanwhile, because the ceramic body 12 is made of a ceramic material and the external electrodes 13 and 14 are made of a metal (e.g., nickel (Ni)), the difference in shrinkage rate of the ceramic and the metal during sintering may cause a stress-concentrating zone in the ceramic body 12, resulting in bending. If the bending occurs, cracks may be generated when the multilayer ceramic capacitor is mounted on a circuit board.

In the present embodiment, the first and second dummy electrodes 153 and 163 are disposed in the first cover layer 123 of the ceramic body 12, which controls a difference in shrinkage rate during a sintering process and suppresses the occurrence of bending.

The first and second dummy electrodes 153 and 163 are disposed in the first cover layer 123. Like the first and second internal electrodes 21 and 22, the first and second dummy electrodes 153 and 163 may be formed by printing a conductive paste containing a conductive metal on the dielectric layer 124.

The first dummy electrode 153 may be in contact with or protrudes from the first end surface 128 of the ceramic body 12. The second dummy electrode 163 may be in contact with or protrudes from the second end surface 129 of the ceramic body 12. For example, referring to FIG. 3, an end portion of the first dummy electrode 153 is in contact with the first end surface 128 of the ceramic body 12, and referring to FIG. 4, an end portion of the first dummy electrode 15 protrudes from the first end surface 128 of the ceramic body 12. In either case, the first dummy electrode 153 is disposed to extend from the first end surface 128 of the ceramic body 12 along the length direction (L-axis direction). Similarly, the second dummy electrode 163 is disposed to extend from the second end surface 129 of the ceramic body 12 along the length direction (L-axis direction).

A length L3 of the first dummy electrode 153 may be smaller than the length L2 of the first margin region M1. In other words, the length L2 of the first margin region M1 may be greater than the length L3 of the first dummy electrode 153. Here, L3 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L3 may mean an arithmetic mean value of distances between opposite ends of the first dummy electrode 153 in the length direction (L-axis direction) shown in the above-described cross-sectional image. L2 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L2 may mean an arithmetic mean value of a distance to end portions in the length direction (L-axis direction) of the three internal electrodes at an uppermost portion in the thickness direction (T-axis direction), a distance to end portions in the length direction (L-axis direction) of the three internal electrodes at a lowermost portion, and a distance to end portions in the length direction (L-axis direction) of the three internal electrodes at a central portion, respectively, from a straight line passing through the central point of the first end surface 128 in the thickness direction (T-axis direction) of the ceramic body 12 shown in the above-mentioned cross-sectional image and perpendicular to the length direction (L-axis direction). Moisture, hydrogen or the like entering from the outside of the ceramic body 12 may be easy to reach the outermost internal electrode in the thickness direction (T-axis direction) of the ceramic body 12. In the present embodiment, by making the length L2 of the first margin region M1 larger than the length L3 of the first dummy electrode 153, the outermost internal electrode may be structurally distanced from the adjacent internal electrode of the opposite polarity and thus prevent the device from deteriorating.

The length L3 of the first dummy electrode 153 may be smaller than the length L4 of the first band portion 135. Herein, L3 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L3 may mean an arithmetic mean value of distances between opposite ends of the first dummy electrode 153 in the length direction (L-axis direction) shown in the above-mentioned cross-sectional image. L4 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L4 may mean a distance to an edge of the band portion 135 from a straight line passing through the central point of the first end surface 128 in the thickness direction (T-axis direction) of the ceramic body 12 and perpendicular to the length direction (L-axis direction).

A length L3' of the second dummy electrode 163 may be smaller than the length L2' of the second margin region M1. The length L3' of the second dummy electrode 163 may be smaller than the length L4' of the second band portion 145. Except for the location, the first dummy electrode 163 corresponds to the first dummy electrode 153, and thus a repeated description thereof will be omitted.

Each of the first and second dummy electrodes 153 and 163 may include a plurality of layers, and each the layer of the first and second dummy electrodes 153 and 163 may be spaced apart from each other along the thickness direction (T-axis direction). Each layers of the first and second dummy electrodes 153 and 163 may be arranged at uniform intervals along the thickness direction (T-axis direction).

The first and second dummy electrodes 153 and 163 may each include nickel (Ni), copper (Cu), tin (Sn), palladium (Pd), gold (Au), or an alloy thereof, but the present disclosure is not limited thereto.

Figure 7:
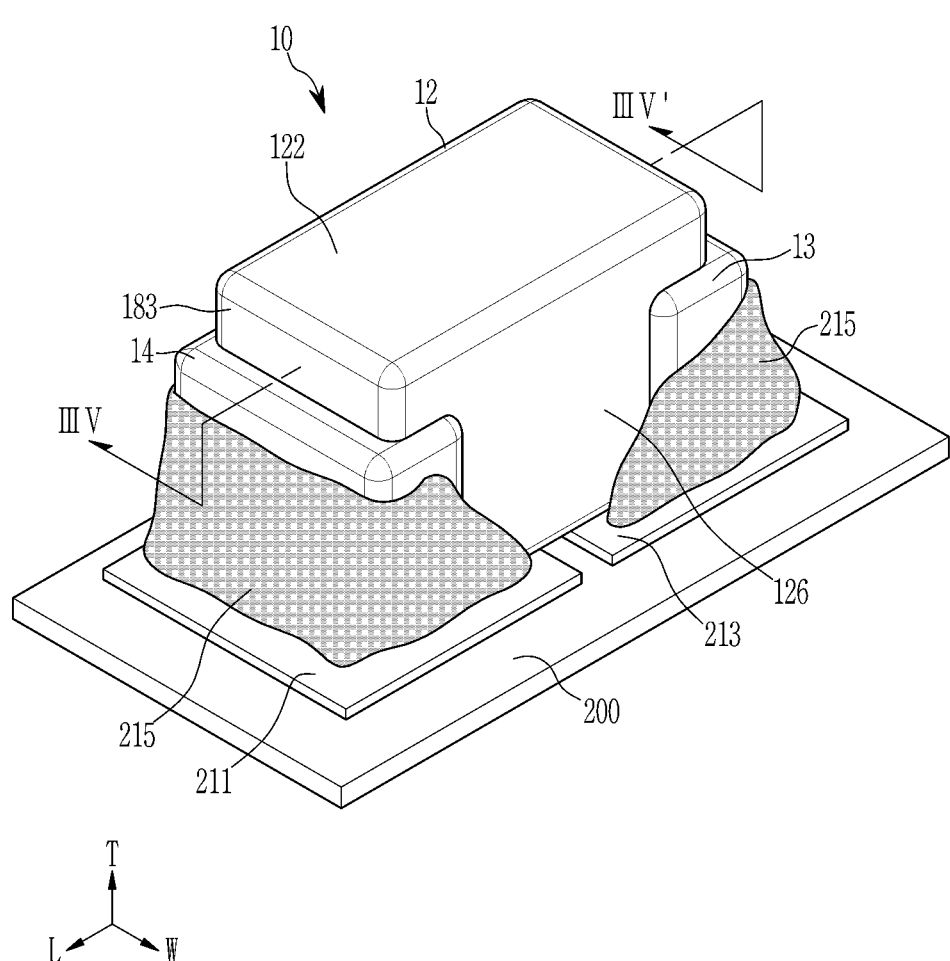
FIG. 7 illustrates a schematic perspective view showing the multilayer ceramic capacitor shown in FIG. 1 mounted on a circuit board.
Figure 8:
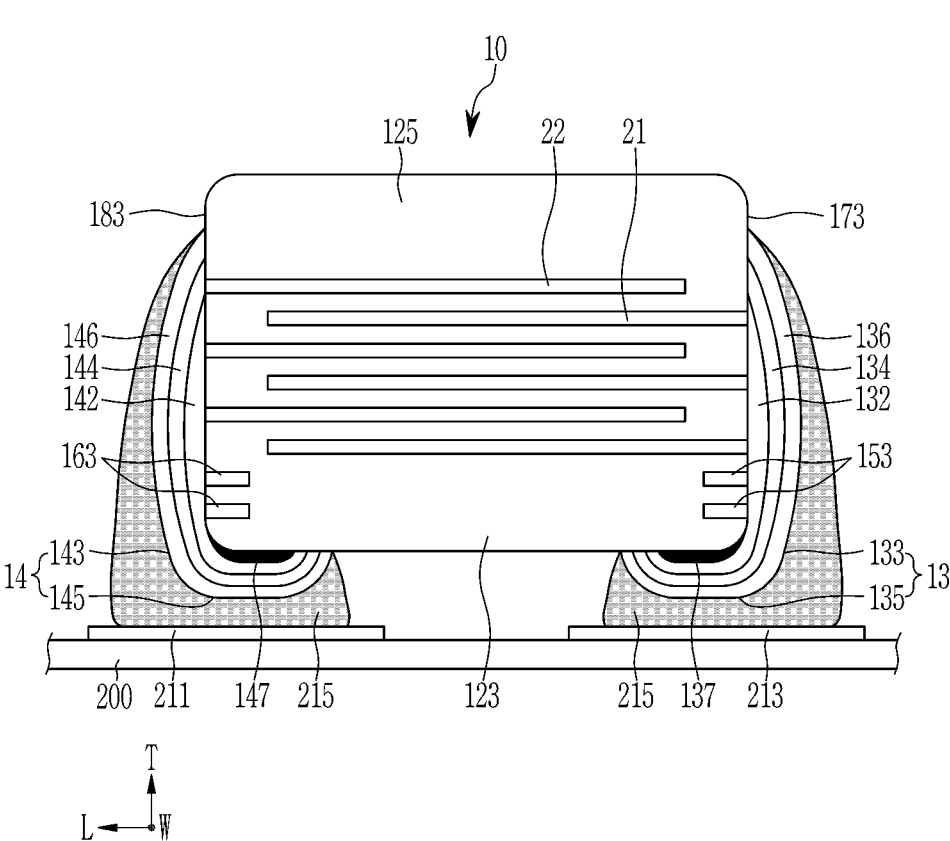
FIG. 8 illustrates a cross-sectional view taken along line IIIV-IIIV' of FIG. 7.

FIG. 7 illustrates a schematic perspective view of the multilayer ceramic capacitor illustrated in FIG. 1 mounted on a substrate, and FIG. 8 illustrates a cross-sectional view taken along line IIIV-IIIV' of FIG. 7.

Referring to FIG. 7 and FIG. 8, the multilayer ceramic capacitor 10 is connected to first and second electrode pads 211 and 213 on an upper surface of the circuit board 200 by means of conductive joining member 215. That is, the multilayer ceramic capacitor 10 may be mounted on the circuit board 200 by means of the first and second electrode pads 211 and 213.

The first and second electrode pads 211 and 213 may be disposed on the upper surface of the circuit board 200 and spaced apart from each other. The band portions 135 and 145 of the first and second external electrodes 13 and 14 of the multilayer ceramic capacitor 10 may be fixed to the circuit board 200 by means of the conductive bonding member 215 in a state in which the first band portion 135 is disposed to be in contact with the first electrode pad 211 and the second band portion 145 is disposed to be in contact with the second electrode pad 213. Meanwhile, the first connection portion 133 of the first external electrode 13 may also be covered with the conductive joining member 215 and the second connection portion 143 of the second external electrode 14 may also be covered with the conductive joining member 215. Accordingly, the multilayer ceramic capacitor 10 may be electrically connected to the first and second electrode pads 211 and 213 of the circuit board 200. The conductive joining member 215 may include, for example, a solder.

In the present embodiment, the first and second external electrodes 13 and 14 of the multilayer ceramic capacitor 10 are respectively mounted on the circuit board 200 by being fixed to the first and second electrode pads 211 and 213 by the conductive joining member 215.

Figure 9:
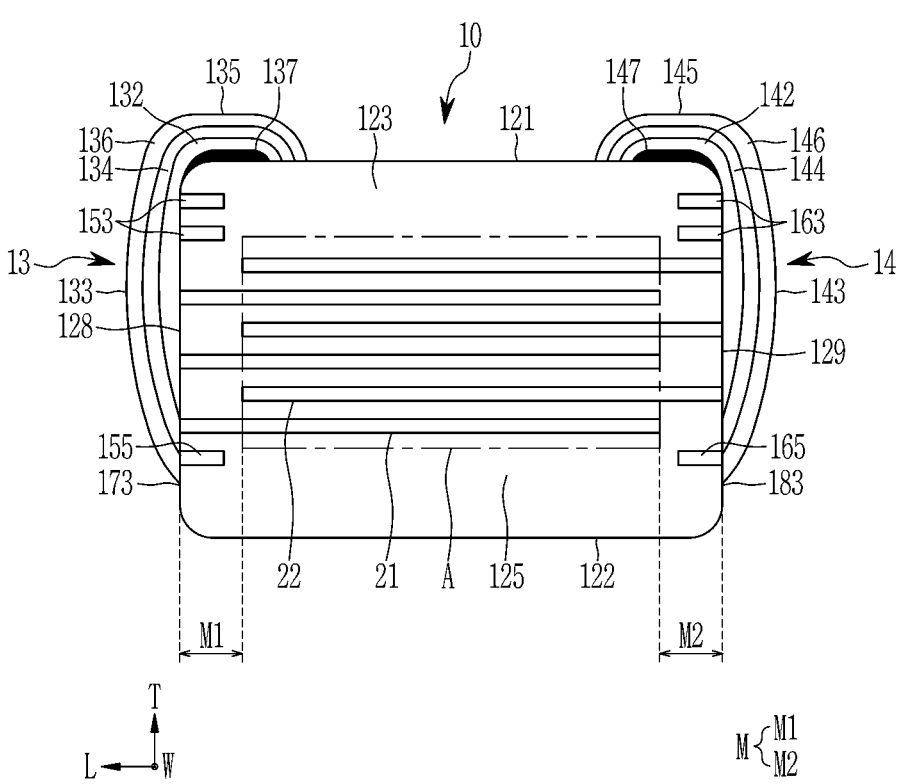
FIG. 9 illustrates a schematic cross-sectional view showing a multilayer ceramic capacitor according to another embodiment.
Figure 10:
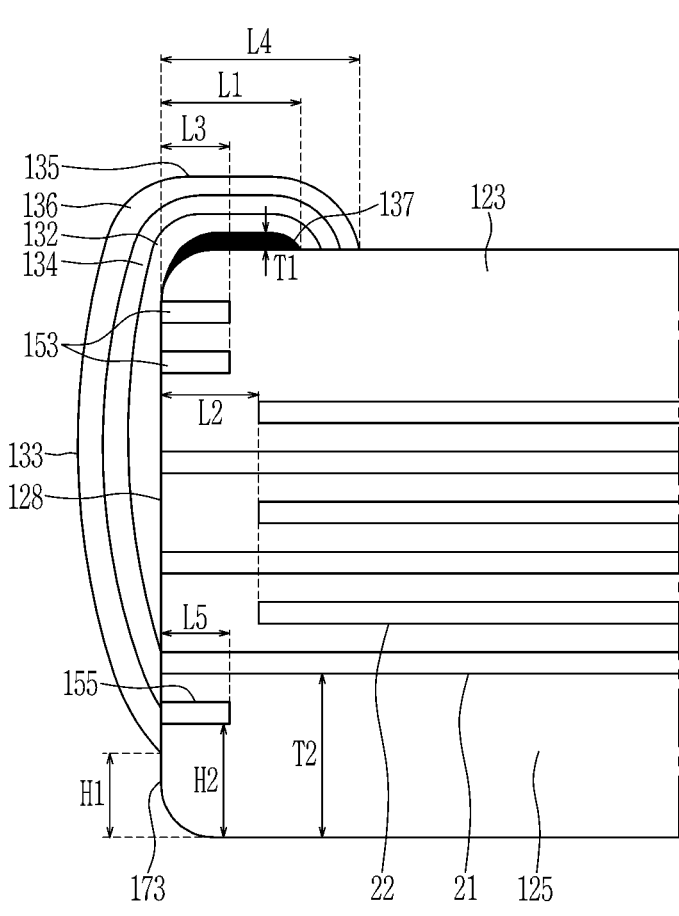
FIG. 10 illustrates a partially enlarged view of FIG. 9.
Figure 11:
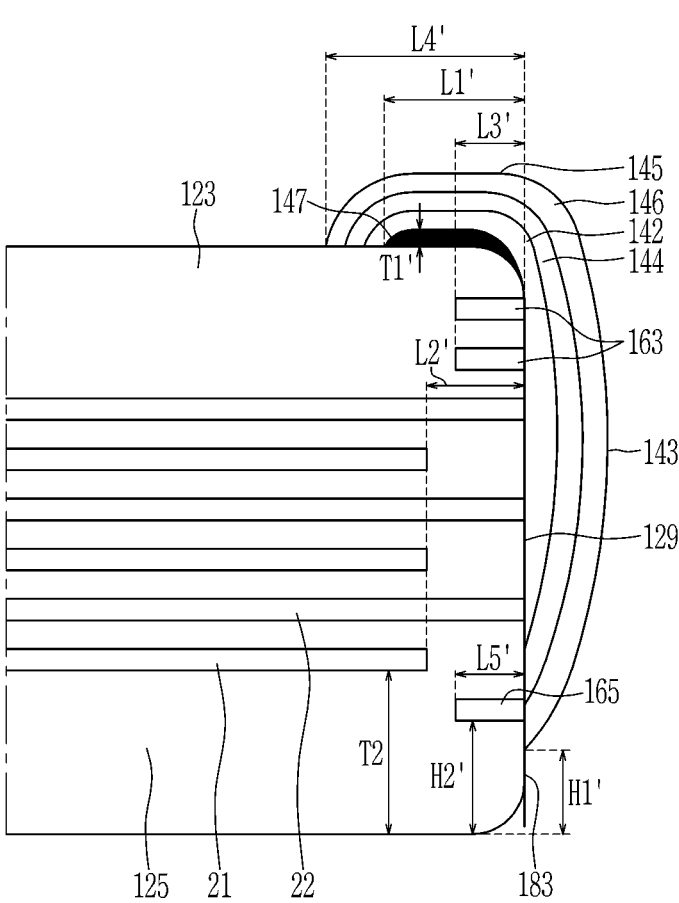
FIG. 11 illustrates another partially enlarged view of FIG. 9.

FIG. 9 illustrates a schematic cross-sectional view showing a multilayer ceramic capacitor according to another embodiment, FIG. 10 illustrates a partially enlarged view of FIG. 9, and FIG. 11 illustrates another partially enlarged view of FIG. 9.

Referring to FIG. 9, FIG. 10 and FIG. 11, a third dummy electrode 155 and a fourth dummy electrode 165 are disposed in the second cover layer 125. Like the first and second internal electrodes 21 and 22, the third and fourth dummy electrodes 155 and 165 may be formed by printing a conductive paste containing a conductive metal on the dielectric layer 124.

The third dummy electrode 153 may be in contact with the first exposed surface 173, or may protrude from the first exposed surface 173. The fourth dummy electrode 163 may be in contact with the second exposed surface 183, or may protrude from the second exposed surface 183. In either case, the third dummy electrode 155 is disposed to extend from the first exposed surface 173 along the length direction (L-axis direction) of the ceramic body 12, and the fourth dummy electrode 165 is disposed to extend from the second exposed surface 183 along the length direction (L-axis direction) of the ceramic body 12.

The first and second external electrodes 13 and 14 are formed by a direct plating method in which a conductive metal is grown by using the first and second seed electrode layers 137 and 147, the end portions of the first and second dummy electrodes 153 and 163, and the end portions of the internal electrodes 21 and 22 as seeds. As in the present embodiment, when the third and fourth dummy electrodes 155 and 165 are added, end portions of the third and fourth dummy electrodes 155 and 165 also function as seeds for plating growth. Accordingly, a formation range of the first and second external electrodes 13 and 14 may be adjusted by adjusting the positions, numbers, etc. of the third and fourth dummy electrodes 155 and 165.

A length L5 of the third dummy electrode 155 may be smaller than the length L2 of the first margin region M1. In other words, the length L2 of the first margin region M1 may be greater than the length L5 of the third dummy electrode 155. Herein, L5 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L5 may mean an arithmetic mean value of distances between opposite ends of the third dummy electrode in the length direction (L-axis direction) shown in the above-mentioned cross-sectional image. L2 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L2 may mean an arithmetic mean value of a distance to end portions in the length direction (L-axis direction) of the three internal electrodes at an uppermost portion in the thickness direction (T-axis direction), a distance to end portions in the length direction (L-axis direction) of the three internal electrodes positioned at a lowermost portion, and a distance to end portions in the length direction (L-axis direction) of the three internal electrodes at a central portion, respectively, from a straight line passing through the central point of the first end surface 128 in the thickness direction (T-axis direction) of the ceramic body 12 shown in the above-mentioned cross-sectional image and perpendicular to the length direction (L-axis direction).

The length L5 of the third dummy electrode 155 may be smaller than the length L4 of the first band portion 135. Herein, L5 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L5 may mean an arithmetic mean value of distances between opposite ends of the third dummy electrode 155 in the length direction (L-axis direction) shown in the above-mentioned cross-sectional image. L4 is measured on the basis of an optical microscope or scanning electron microscope (SEM) image of a cross-section (taken in the length direction (L-axis direction)-thickness direction (T-axis direction)) at the central point of the multilayer ceramic capacitor 10 in the width direction (W-axis direction). L4 may mean a distance to an edge of the first band portion 135 from a straight line passing through the central point of the first end surface 128 in the thickness direction (T-axis direction) of the ceramic body 12 and perpendicular to the length direction (L-axis direction).

A height H2 of the third dummy electrode 155 may be greater than the height H1 of the exposed surface 173. H1 is measured on the basis of an optical microscope or scanning electron microscope (SEM) image of a cross-section (taken in the length direction (L-axis direction)-thickness direction (T-axis direction)) at a central point of the ceramic body 12 in the width direction (W-axis direction). H1 may mean a distance from a straight line passing through the central point of the lower surface 122 in the length direction (L-axis direction) and perpendicular to the thickness direction (T-axis direction) of the ceramic body 12 shown in the above-mentioned cross-sectional image to the edge of the first connection portion 133. H2 may mean a distance to the third dummy electrode 155 from a straight line passing through the central point of the lower surface 122 in the length direction (L-axis direction) of the ceramic body 12 and perpendicular to the thickness direction (T-axis direction) to the nearest internal electrode.

A length L5' of the fourth dummy electrode 165 may be smaller than the length L2' of the second margin region M2. In other words, the length L2' of the second margin region M2 may be greater than the length L5' of the fourth dummy electrode 165. The length L5' of the fourth dummy electrode 165 may be smaller than the length L4' of the second band portion 145. A height H2' of the fourth dummy electrode 165 may be greater than the height H1' of the second exposed surface 183. Except for the location, the fourth dummy electrode 165 corresponds to the third dummy electrode 155, so a repeated description thereof will be omitted.

Each of the third and fourth dummy electrodes 155 and 165 may include a plurality of layers, and each layer of the third and fourth dummy electrodes 155 and 165 may be spaced apart from each other along the thickness direction (T-axis direction). Meanwhile, each layer of the third and fourth dummy electrodes 155 and 165 may be disposed at uniform intervals along the thickness direction (T-axis direction).

The third and fourth dummy electrodes 155 and 165 may each include nickel (Ni), copper (Cu), tin (Sn), palladium (Pd), gold (Au), or an alloy thereof, but the present disclosure is not limited thereto.

Except for the above, the multilayer ceramic capacitor according to the embodiment illustrated in FIG. 9 is the same as the multilayer ceramic capacitor according to the embodiment illustrated in FIG. 1, and thus descriptions of repeated or identical parts will be omitted.

Figure 12:
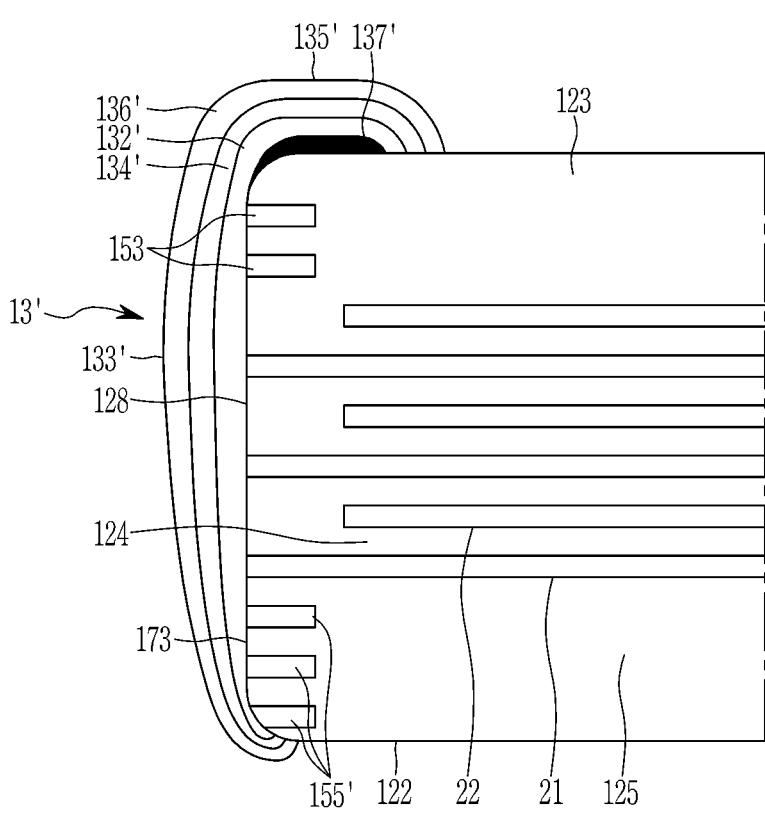
FIG. 12 illustrates a schematic cross-sectional view showing a multilayer ceramic capacitor according to a comparative embodiment.

Meanwhile, FIG. 12 illustrates a schematic cross-sectional view showing a multilayer ceramic capacitor according to a comparative example.

Referring to FIG. 12, the first external electrode 13' has grown past the first end surface 128 along the thickness direction (T-axis direction) to the lower surface 122 of the ceramic body 12.

The first external electrode 13' is formed by a direct plating method in which a conductive metal is grown by using the seed electrode layer 137, the end portions of the first dummy electrodes 153, and the end portions of the internal electrodes 22 as seeds. As in the present comparative example, when the third dummy electrodes 155' are added, end portions of the third dummy electrodes 155 also function as seeds for plating growth.

However, if the third dummy electrodes 155 are disposed close to the lower surface 122 of the ceramic body 12 (or the lower surface of the second cover layer 125), when the direct plating method is used, the first external electrode 13' may grow up to or beyond the lower surface 122 of the ceramic body 12. This is because when the direct plating method is used, the conductive metal grows not only along the length direction (L-axis direction) but also along the thickness direction (T-axis direction) of the ceramic body 12. As a result, in the comparative example, the first external electrode 13' protrudes from the lower surface 122 of the ceramic body 12, which may deteriorate the flatness of the multilayer ceramic capacitor.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

10: multilayer ceramic capacitor
12: ceramic body

13: first external electrode
14: second external electrode
132, 142: first plating layer
134, 144: second plating layer
136, 146: third plating layer
153: first dummy electrode
163: second dummy electrode
155: third dummy electrode
165: fourth dummy electrode
121: upper surface
122: lower surface
A: active region
M: margin region
21, 22: internal electrode
123: first cover layer
124: dielectric layer
125: second cover layer
126: first side surface
127: second side surface
133: first connection portion
143: second connection portion
135: first band portion
145: second band portion
137: first seed electrode layer
147: second seed electrode layer
128: first end surface
129: second end surface
173: first exposed surface
183: second exposed surface
200: circuit board
211: first electrode pad
213: second electrode pad
215: conductive joining member

What is claimed is:

1. A multilayer ceramic capacitor comprising:
a ceramic body that includes a plurality of dielectric layers and a plurality of internal electrodes;
an external electrode including a connection portion that covers a portion of an end surface of the ceramic body in a first direction, the end surface including an exposed surface that is not covered by the connection portion, and a band portion that extends from the connection portion to cover a side surface of the ceramic body in a second direction, the second direction intersecting the first direction;
a first cover layer disposed between the side surface and the internal electrode closest to the side surface;
a second cover layer opposed to the first cover layer along the second direction;
an active region in which the plurality of internal electrodes overlaps along the second direction, and spaced apart from the end surface by a first distance;
a first dummy electrode disposed in the first cover layer; and
a seed electrode layer disposed between the band portion and the first cover layer,
wherein a length of the seed electrode layer in the first direction is greater than the first distance and greater than a length of the first dummy electrode in the first direction.

2. The multilayer ceramic capacitor of claim 1, wherein a thickness T1 of the seed electrode layer is 0.05 um or more and 1.0 um or less.

3. The multilayer ceramic capacitor of claim 1, wherein the length of the seed electrode layer is ¼ or more and less than ½ of a length of the ceramic body in the first direction.

4. The multilayer ceramic capacitor of claim 1, wherein an edge of the connection portion toward the second cover layer is spaced apart from an outer surface of the second cover layer by a second distance in the second direction, and the second distance is smaller than a thickness of the second cover layer.

5. The multilayer ceramic capacitor of claim 1, wherein the first dummy electrode is in contact with or protrudes from the end surface.

6. The multilayer ceramic capacitor of claim 1, wherein the length of the first dummy electrode is a distance between opposite end portions of the first dummy electrode along the first direction, and the length of the first dummy electrode is smaller than the first distance.

7. The multilayer ceramic capacitor of claim 1, wherein the first dummy electrode includes a plurality of layers.

8. The multilayer ceramic capacitor of claim 7, wherein the layers of the first dummy electrode are spaced apart from each other along the second direction.

9. The multilayer ceramic capacitor of claim 8, wherein each layer of the first dummy electrode is disposed at uniform intervals along the second direction.

10. The multilayer ceramic capacitor of claim 1, further comprising:

a second dummy electrode disposed in the second cover layer.

11. The multilayer ceramic capacitor of claim 10, wherein an edge of the connection portion toward the second cover layer is spaced apart from an outer surface of the second cover layer by a second distance in the second direction, the second dummy electrode is in contact with or protrudes from the end surface, the second dummy electrode is spaced apart from the outer surface of the second cover layer by a third distance in the second direction, and the third distance is greater than the second distance and smaller than a thickness of the second cover layer.

12. The multilayer ceramic capacitor of claim 10, wherein a length of the second dummy electrode is a distance between opposite end portions of the second dummy electrode along the first direction, and the length of the second dummy electrode is smaller than the first distance.

13. The multilayer ceramic capacitor of claim 10, wherein the second dummy electrode includes a plurality of layers.

14. The multilayer ceramic capacitor of claim 13, wherein each layer of the second dummy electrode is spaced apart from each other along the second direction.

15. The multilayer ceramic capacitor of claim 13, wherein each layer of the second dummy electrode is disposed at uniform intervals along the second direction.

16. The multilayer ceramic capacitor of claim 1, wherein the external electrode includes nickel (Ni), copper (Cu), tin (Sn), palladium (Pd), gold (Au), or an alloy thereof.

17. The multilayer ceramic capacitor of claim 16, wherein the external electrode includes a plurality of plating layers.

18. The multilayer ceramic capacitor of claim 17, wherein the external electrode includes: a first plating layer that covers the seed electrode layer and a portion of the end surface of and the ceramic body; and a second plating layer that covers the first plating layer.

19. The multilayer ceramic capacitor of claim 18, wherein the external electrode further includes a third plating layer that covers the second plating layer.

20. The multilayer ceramic capacitor of claim 1, wherein no other electrode layer that overlaps the plurality of internal electrodes in the active region exists in the first cover layer.

* * * * *